United States Patent [19]
Abolins et al.

[11] 3,983,090
[45] Sept. 28, 1976

[54] COMPOSITION OF A POLYPHENYLENE ETHER AND STYRENE RESIN AND AN ACRYLIC RESIN IN COMBINATION WITH A DIENE RUBBER-CONTAINER RESIN

[75] Inventors: Visvaldis Abolins, Delmar; Donald L. Reinhard, Albany, both of N.Y.

[73] Assignee: General Electric Company, Pittsfield, Mass.

[22] Filed: May 17, 1974

[21] Appl. No.: 471,159

Related U.S. Application Data

[62] Division of Ser. No. 189,393, Oct. 14, 1971, Pat. No. 3,833,688.

[52] U.S. Cl. .............................. 260/42.18; 260/874; 260/876 R
[51] Int. Cl.² ..................... C08K 7/14; C08L 51/04
[58] Field of Search ............. 260/874, 876 R, 42.18

[56] References Cited
UNITED STATES PATENTS

| | | | |
|---|---|---|---|
| 3,170,964 | 2/1965 | Grabowski | 260/876 R |
| 3,383,435 | 4/1968 | Cizek | 260/874 |
| 3,487,127 | 12/1969 | Erchak, Jr. et al. | 260/876 R |
| 3,639,508 | 2/1972 | Kambour | 260/876 B |
| 3,665,058 | 5/1972 | Snodgrass et al. | 260/876 R |
| 3,833,688 | 9/1974 | Abolins et al. | 260/876 R |

*Primary Examiner*—J. Ziegler
*Attorney, Agent, or Firm*—Granville M. Pine; Edward A. Hedman; William F. Mufatti

[57] ABSTRACT

There are provided compositions comprising a polyphenylene ether and an acrylic resin in combination with a diene rubber-containing resin, the compositions optionally containing a styrene resin. Illustratively, the addition of an acrylic resin modified butadiene rubber-acrylonitrile-styrene resin to polyphenylene ethers or mixtures of polyphenylene ethers and polystyrenes provides unexpected improvements in toughness in parts molded from the compositions, and in their resistance to gasoline. Such properties are improved without substantially impairing gloss or surface appearance.

32 Claims, No Drawings

COMPOSITION OF A POLYPHENYLENE ETHER AND STYRENE RESIN AND AN ACRYLIC RESIN IN COMBINATION WITH A DIENE RUBBER-CONTAINER RESIN

This is a division of application Ser. No. 189,393, filed Oct. 14, 1971, now U.S. Pat. No. 3,833,688.

This invention relates to novel resin compositions and more particularly, to polymer compositions comprising a polyphenylene ether and an acrylic resin in combination with a diene rubber-containing resin, the compositions optionally containing a polystyrene resin.

BACKGROUND OF THE INVENTION

The polyphenylene ethers are known and described in numerous publications including Hay, U.S. Pat. Nos. 3,306,874 and 3,306,875 and Stamatoff U.S. Pat. Nos. 3,257,357 and 3,257,358. The high molecular weight polyphenylene ethers are high performance engineering thermoplastics possessing relatively high melt viscosities and softening points — i.e., in excess of 275°C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts moled from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, one method for improving the melt processability of the polyphenylene ethers is disclosed in a commonly-assigned assigned patent, U.S. Pat. No. 3,379,792, incorporated herein by reference. According to this patent, flow properties of the polyphenylene ethers are improved by blending with from about 0.1 to 25 parts by weight of a polyamide. In another commonly-assigned patent, U.S. Pat. No. 3,361,851, a polyphenylene ether composition comprising a polyphenylene ether blended with a polyolefin is disclosed. The polyolefin is added to improve impact strength and resistance to aggressive solvents. In a third commonly-assigned patent, Cizek, U.S. Pat. No. 3,383,435, there are provided means for simultaneously improving the melt processability of the polyphenylene ether resins while simultaneously up-grading many properties of polystyrene resins. The invention of the Cizek patent is based upon the discovery that the polyphenylene ether resins and polystyrene resins, including modified polystyrene resins, are combinable in all proportions and result in compositions having many properties improved over those of either of the components.

One preferred embodiment of the Cizek patent is a composition comprising a high-impact, rubber reinforced polystyrene and a poly(2,6-dialkyl-1,4-phenylene)ether. This composition was preferred because it provides the aforementioned objectives of improving the melt-processability properties of the polyphenylene ether resin and provides the further advantage of improving impact resistance of parts molded from the blend. Furthermore, the Cizek composition of the polyphenylene ether and the high impact polystyrene could be custom-formulated to provide predetermined properties ranging between those of the polystyrene and those of the polyphenylene ether by controlling the ratio of the two polymers. The reason for this is that the blend exhibits a single set of thermodynamic properties rather than two distinct sets of properties — i.e., one for each of the components of the blend as is typical with blends of prior art.

Another preferred embodiment of the Cizek patent is a composition comprising a diene rubber-containing interpolymer resin (ABS—16% ACN, 41% styrene, 43% butadiene units) and a poly(2,6-dimethyl-1,4-phenylene)ether. Such compositions (e.g., Example 11 of Cizek, U.S. Pat. No. 3,383,435) are shown to have somewhat enhanced resistance to organic environments, e.g., gasoline, acetone and hexane, although the data are somewhat variable. No impact strength data are given for such compositions, although, as will be shown hereinafter, a similar diene-containing interpolymer resin (25% ACN, 30% styrene, 45% butadiene units) provides compositions with poly(2,6-dimethyl-1,4-phenylene)ether which possess good, but not outstanding impact strengths over the entire range of composition ratios.

With respect to the preferred embodiments in the Cizek patent, it is believed that the impact resistance of the polyphenylene ethers is improved because of the diene rubber content in the high-impact polystyrene and in the diene rubber resin and, in this respect, the improvement in impact strength appears to be directly proportional to the diene rubber content of the polystyrene resin or the ABS resin, increasing concentrations of diene rubber resulting in increased impact strength. However, it has also been found — as a disadvantage — that the gloss of parts molded from the polyphenylene ether resin and the high impact polystyrene resin or the diene rubber resin is inversely proportional to the diene rubber content and that, therefore, as the diene rubber content is increased, gloss and surface appearance of the molded parts are decreased. Consequently, increasing the diene rubber content of the compositions results in increased impact strength, but with a sacrifice in surface appearance and gloss. Alternatively, reduction in diene rubber content such as by the use of unreinforced (crystal) polystyrene results in parts having good gloss, but at a sacrifice to impact strengths. Because both impact strength and gloss are commercially important properties in the manufacture of molded parts, although the preferred compositions of the Cizek patent provide the advantages noted above, it has been found difficult to provide compositions having both optimum impact strength and surface appearance.

In addition, as mentioned above, the polyphenylene ether - diene rubber interpolymer resin compositions of the Cizek patent provide improvements in resistance to aggressive organic solvents, but the need still exists for compositions with outstanding resistance to gasoline.

It has now been discovered that an acrylic resin-modified diene rubber-containing interpolymer resin, will impart unexpectedly high impact strengths and chemical resistance properties both to polyphenylene ether resins and compositions of polyphenylene ether resins and polystyrene resins. For example, a piece molded from a composition comprising 60 parts of polyphenylene ether resin and 40 parts of a poly(methyl methacrylate) modified butadiene resin containing interpolymerized acrylonitrile and styrene units (ABS) has an Izod impact strength of 9 ft.lbs./in. notch and when placed in a 1% strain jig and immersed in gasoline, no crazing or cracking occurred even after several hours. Furthermore, a composition of 50 parts of poly(2,6-dimethyl-1,4-phenylene) ether, 40 parts of a poly(methyl methacrylate) modified ABS resin and 10 parts of rubber modified high impact polystyrene resin can be molded into a part with an Izod impact strength of 9.2 ft.lbs. per inch notch and similar, excellent resistance to a gasoline environment. Such blends can also be reinforced with fibrous glass with the enhancement in physical properties and no loss of excellent resistance to gasoline environments. All such blends have higher impact strengths, greater tensile elongations and substantially improved resistance to organic solvent attack than the corresponding compositions of the prior art in which the diene rubber-containing resin is not modified by the acrylic resin. In addition the new compositions have unusually good resistance to distortion by heat.

DESCRIPTION OF THE INVENTION

According to the present invention there are provided normally rigid thermoplastic compositions comprising
  a. a polyphenylene ether resin or a composition comprising a polyphenylene ether resin and a styrene resin and
  b. a resinous composition comprising a polymerized acrylic monomer and a polymerized diene. In illustrative features, component (b) may be a polymerized acrylic monomer and the polymerization product of a mixture of a polymerized diene rubber, an alkenyl cyanide and a vinyl aromatic compound. In preferred compositions, component (b) will be present in an amount of from about 10 to about 80% by weight of the total resinous components of the composition.

Preferred compositions will be those in which the polyphenylene ether comprises at least 1% by weight of the total resinous components in the composition.

It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, $CaSiO_3$, asbestos, $TiO_2$, titanate whiskers, glass flakes and fibers and the like. Such reinforcements will be present in an amount of e.g., 1 to 80% by weight, preferably 10 to 60% by weight. Especially preferred as a reinforcement is fibrous glass.

In preferred compositions the polyphenylene ether resins in component (a) will be those having repeating structural units of the formula

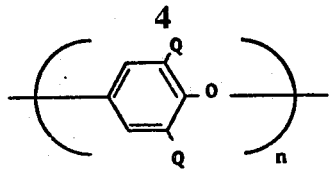

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl).

With respect to component (b), poly(alkyl acrylate) resins are made by means well known in the art and are also available commercially from a number of sources. The acrylic resins are polymers or copolymers of alkyl esters of acrylic or methacrylic acids. These colorless monomeric liquid esters polymerize readily in the presence of light, heat or a catalyst, such as benzoyl peroxide, to high molecular weight polymers, e.g., molecular weights of 100,000 or more.

It is known in the art to modify such acrylic resins by blending with other polymers and by grafting acrylic resin chains onto a rubber backbone, blending such resins with other additives and the like. The acrylic resins contemplated by the present invention are those known in the art as acrylic resin modified diene rubber-containing resins. Depending on how they are made, preferred such compositions will generally be either (i) a grafted interpolymer of alkyl, e.g., methyl, methacrylate with a diene rubber, which in turn has been interpolymerized with styrene and acrylonitrile or (ii) a blend of poly(methyl methacrylate) and a diene rubber, which may also be interpolymerized or blended with polymerized styrene, acrylonitrile and the like.

The term "diene rubber" when used herein means a rubbery polymer or copolymer of a diene, e.g., butadiene or isoprene, with each other or with other conventional comonomers, such as styrene, vinyl toluene and the like. The term includes natural rubber and synthetic diene rubbers, in all configurations. Preferred rubbers will comprise polybutadiene or a rubbery butadiene-styrene copolymer (about 72% BD - 28% S).

The term "ABS", for convenience, is used in its broadest, art-recognized sense to include a family of particular diene rubber resins, namely acrylonitrile, butadiene, styrene interpolymers and blends as well as close analogs thereof. Accordingly, ABS resins will include a family of those from alkenyl cyanides, diene rubbers and vinyl aromatic hydrocarbons. Among the vinyl aromatic hydrocarbons, styrene may be replaced in whole or in part by alpha methyl styrene, vinyl toluenes, alpha methyl vinyl toluenes, and the like. Acrylonitrile may be replaced in whole or in part by methacrylonitrile and ethacrylonitrile, and the like. The acrylonitrile preferably comprises from 5 to 30% by weight of the three-component ABS mixture, the sytrene 30 to 80% by weight and the diene rubber from 10 to 60% by weight. It is preferred to modify such ABS resins with from 20 to 50% by weight of polyacrylate for use in the present compositions. Especially preferred is to graft the polyacrylate onto the diene rubber, e.g., ABS, resins.

Blends of poly(methyl methacrylate) and its analogs with interpolymers or blends of a diene rubber, which may also contain styrene and acrylonitrile can be made by co-extruding or milling the components, or by mixing latices and co-precipitating or by all other well known methods. Suitable procedures are illustrated, for example, in Grabowski, U.S. Pat. No. 3,170,964.

Interpolymers of methyl methacrylate on diene rubber-containing resin backbones can be made by well known grafting techniques, e.g., in bulk, suspension or emulsion systems. For example, acrylonitrile or styrene monomers and mixtures thereof can be grafted onto a diene rubber, e.g., polybutadiene or butadiene-styrene, and then, on top of this, grafted acrylate can be built up by polymerizing an alkyl acrylate or methacrylate. On the other hand, onto a diene rubber backbone, there can be grafted a mixture of monomeric alkyl methacrylate, acrylonitrile and styrene, all at once or sequentially. Suitable procedures are illustrated, for example, in Feuer, U.S. Pat. No. 2,857,360.

Preferred acrylic modified diene rubber-containing resins for use as component (b) will contain, for example, from about 20 to about 50% by weight of poly(methyl methacrylate) and from about 80 to about 50% by weight of a diene rubber graft copolymerized with acrylonitrile and styrene. Especially preferred will be such component (b)'s wherein the graft copolymer includes from about 40 to 90% by weight of grafted acrylonitrile and styrene and from 60 to 10% by weight of a polybutadiene or rubbery butadient styrene copolymer backbone. The most preferred component (b)'s will contain about 20 to 25% methyl methacrylate units, 5 to 10% acrylonitrile units, 30 to 40% butadiene units and 30 to 40% styrene units.

One such resin is available commercially under the designation Blendex 425 from Marbon Chemical Division of Borg-Warner Corporation.

As noted above, the acrylic resin modified diene rubber-containing resin may be added to a polyphenylene ether resin or to a composition of a polyphenylene ether resin with an additional resin, preferably a polystyrene resin and most preferably, a high impact polystyrene resin. As disclosed in the above-mentioned Cizek patent, the styrene resin most readily combinable with the polyphenylene ether resin is one having at least 25% by weight polymer units derived from a vinyl aromatic monomer having the formula:

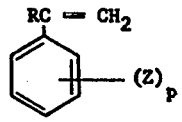

where R is hydrogen, alkyl of 1 to 4 carbon atoms or halogen; Z is a member selected from the class consisting of vinyl, hydrogen, or alkyl of from 1 to 4 carbon atoms; and p is from 1 to 5. Such compositions will comprise from 1 to 99% by weight of the polyphenylene ether component and from 99 to 1% by weight of the polystyrene resin. The preferred styrene resin for purposes of this invention is one comprising a rubber modified polystyrene, e.g., blended or grafted with from about 3 to 30, preferably from 4 to 12% by weight of a polybutadiene or a rubbery copolymer, e.g., of about 70% BD and 30% styrene.

The amount of acrylic resin modified diene rubber-containing resin added to the polyphenylene ether resin or composition thereof with polystyrene may vary within rather broad limits, but preferably ranges from about 10 to 80% by weight of the resinous components.

In a preferred family of compositions the polyphenylene ether comprises from about 1 to about 90% by weight, the resinous poly(alkyl methacrylate)/diene rubber, alkenyl cyanide, vinyl aromatic component (b) comprises from about 10 to about 80% by weight, and the styrene resin component comprises from up to the remainder by weight of the total weight of the resinous components in said composition. Especially preferred are compositions in which the polyphenylene ether is poly(2,6-dimethyl-1,4-phenylene)ether and comprises from about 20 to about 90% by weight, component (b) is a composition of poly(methyl methacrylate), polybutadiene and grafted styrene and acrylonitrile and comprises from about 10 to about 80% by weight and the styrene resin component is a rubber modified polystyrene and comprises from 0 up to about 60% by weight of the total weight of the resinous components in the blend.

It should be obvious that other additives may be present in the compositions such as plasticizers, pigments, flame retardants and stabilizers in amounts varying between about 1 and 30 per cent by weight of the total composition. The above-stated range for the acrylic resin modified diene rubber-containing resin, the polyphenylene ether resin and, if present, the polystyrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form — as the case may be — extruding the blend and chopping into pellets suitable for molding to shape by means conventionally used to mold normally solid thermoplastic compositions.

The following procedure illustrates a method whereby an acrylic resin-modified diene rubber-containing resin composition suitable for use in the compositions of this invention can be prepared.

PROCEDURE

The diene rubber backbone latex is prepared by injecting the following ingredients into a reactor and polymerizing for 40 hours at 65°C.

| Ingredients | Parts by weight |
| --- | --- |
| butadiene | 100.0 |
| water | 80.0 |
| sodium oleate | 3.0* |
| $K_2S_2O_8$ | 0.25 |
| dodecyl mercaptan | 0.15 |

-continued

| Ingredients | Parts by weight |
| --- | --- |
| NaOH | 0.014 |

*1 part of soap is initially charged, followed by the remainder during the polymerization.

An interpolymer of styrene and acrylonitrile is grafted onto the polybutadiene backbone by charging the following ingredients into a pressure tight reactor and polymerizing at 65°–85°C. for 3 hours:

| Ingredients | Parts by weight |
| --- | --- |
| polybutadiene (latex solids as above) | 46.8 |
| acrylonitrile | 9.35 |
| styrene | 46.8 |
| cumene hydroperoxide | 0.75 |
| sodium salt of hydrogenated disproportionated rosin | 2.0 |
| sodium pyrophosphate | 0.5 |
| sodium hydroxide | 0.15 |
| sodium alkyl naphthalene sulfonate | 0.15 |
| dextrose | 1.0 |
| ferrous sulfate | 0.01 |
| mixed tertiary mercaptan (60:20:20 $C_{12}$:$C_{14}$:$C_{16}$) | 0.5 |
| water, including that present in latex | 160.0 |

The product is recovered by coagulating the reaction mixture with dilute brine and sulfuric acid, heating to 95°C. to produce partial granulation, filtering and washing with water, then drying to constant weight at 110°C.

The acrylic modified composition is formed by mixing 75 parts of the grafted interpolymer with 25 parts by weight of poly(methyl methacrylate), adding 1 part by weight of calcium stearate (lubricant) and working in a Banbury mixer at 420°F. Blending is continued on a two-roll mill until the mixture is uniform, then it is cooled and cut up into granules or powder. This composition contains approximately 7% acrylonitrile units, 35% butadiene units, 35% styrene units and 23% methyl methacrylate units. The poly(methylacrylate) content and the other components can be varied by making obvious adjustments in the recipes and blending ratios.

DESCRIPTION OF THE PREFERRED EMBODIMENTS

The advantages obtained by providing compositions of acrylic resin modified diene rubber-containing resins with a polyphenylene ether resin alone or in combination with another resin are illustrated in the following examples which are set forth as further description of the invention, but are not to be construed as limiting the invention thereto.

EXAMPLE 1

The following formulation is physically mixed in a Waring-type blender, extruded in a ¾ inch Wayne-type extruder and molded into test pieces in a 3 oz. Newbury injection molding machine. The physical tests are carried out by the following procedures: ⅛ inch notched Izod Impact Strength, ASTM D-256-56; Heat distortion temperature at 264 psi, ASTM D-648-56; Tensile strength and elongation, ASTM D-638-61T. Extrusion and molding conditions and physical properties are as follows:

| Ingredients | Parts by weight |
| --- | --- |
| poly(2,6-dimethyl-1,4-phenylene) ether* | 90 |
| acrylic resin modified, acrylonitrile-polybutadiene-styrene resin** | 10 |
| Extrusion conditions | |
| Die, °F. | 560 |
| Front, °F. | 640 |
| Rear, °F. | 580 |
| Screw speed, rpm. | 60 |
| Molding conditions | |
| Barrel, °F. | 560 |
| Mold, °F. | 140 |
| Pressure, psi. | 1400 |
| Properties | |
| Izod impact (ft.lbs./in. notch) | 2.8 |
| Heat distortion temperature, °F. | 367 |
| Tensile yield strength (psi) | 10400 |
| Tensile ultimate strength (psi) | 10700 |
| Elongation, % | 80 |

*General Electric Company, PPO in powder form, intrinsic viscosity 0.5–0.6 dl./g.
**Poly(methyl methacrylate) modified acrylonitrile-butadiene-styrene resin composition, Blendex 425, Marbon Chemical Division of Borg-Warner Corp., containing about 7% acrylonitrile units; 35% butadiene units, 35% styrene units and 23% methyl methacrylate units, by weight.

EXAMPLE 2

The following formulation is blended, molded and tested by the procedure of Example 1. Blending, molding and property test data are as follows:

| Ingredients | Parts by weight |
| --- | --- |
| poly(2,6-dimethyl-1,4-phenylene) ether (as in Example 1) | 75 |
| acrylic resin modified, acrylonitrile-butadiene-styrene resin (as in Example 1) | 25 |
| Extrusion Conditions | |
| Die, °F. | 560 |
| Front, °F. | 640 |
| Rear, °F. | 580 |
| Screw speed, rpm | 60 |
| Molding conditions | |
| Barrel, °F. | 550 |
| Mold, °F. | 150 |
| Pressure, psi | 1200 |
| Properties | |
| Izod impact (ft.lbs./in. notch) | 2.8 |
| Heat distortion temperature, °F. | 337 |
| Tensile yield strength, psi | 9300 |
| Tensile ultimate strength, psi | 9800 |
| Elongation, % | 84 |

EXAMPLE 3

The following formulation is blended, molded and tested by the procedure of Example 1. Blending, molding and property test data are as follows:

| Ingredients | Parts by weight |
| --- | --- |
| poly(2,6-dimethyl-1,4-phenylene) ether (as in Example 1) | 60 |
| acrylic resin modified, acrylonitrile-butadiene-styrene (as in Example 1) | 40 |
| Extrusion Conditions | |
| Die, °F. | 550 |
| Front, °F. | 640 |
| Rear, °F. | 560 |
| Screw speed, rpm | 60 |
| Molding conditions | |
| Barrel, °F. | 525 |
| Mold, °F. | 125 |
| Pressure, psi | 1000 |
| Properties | |
| Izod impact (ft.lbs./in. notch) | 9.0 |
| Heat distortion temperature, °F. | 315 |
| Tensile yield strength, psi | 7300 |
| Tensile ultimate strength, psi | 7900 |

| Elongation, % | 83 |

EXAMPLE 4

The following formulation is blended, molded, and tested by the procedure of Example 1. Blending, molding and property test data are as follows:

| Ingredients | Parts by weight |
| --- | --- |
| poly(2,6-dimethyl-1,4-phenylene) ether (as in Example 1) | 50 |
| acrylic resin modified, acrylonitrile-butadiene-styrene resin (as in Example 1) | 50 |
| Extrusion Conditions | |
| Die, °F. | 520 |
| Front, °F. | 600 |
| Rear, °F. | 520 |
| Screw speed, rpm | 60 |
| Molding conditions | |
| Barrel, °F. | 525 |
| Mold, °F. | 170 |
| Pressure, psi. | 1500 |
| Properties | |
| Izod impact (ft.lbs./in. notch) | 4.0 |
| Heat distortion temperature, °F. | 300 |
| Tensile yield strength, psi. | 6500 |
| Tensile ultimate strength, psi. | 7000 |
| Elongation, % | 71 |

EXAMPLE 5

The following formulation is blended, molded and tested by the procedure of Example 1. Blending, molding and property test data are as follows:

| Ingredients | Parts by weight |
| --- | --- |
| poly(2,6-dimethyl-1,4-phenylene) ether (as in Example 1) | 25 |
| acrylic resin modified, acrylonitrile-butadiene-styrene resin (as in Example 1) | 75 |
| Extrusion Conditions | |
| Die, °F. | 500 |
| Front, °F. | 600 |
| Rear, °F. | 500 |
| Screw speed, rpm | 60 |
| Molding conditions | |
| Barrel, °F. | 450 |
| Mold, °F. | 125 |
| Pressure, psi. | 1000 |
| Properties | |
| Izod impact (ft.lbs./in. notch) | 4.0 |
| Heat distortion temp., °F. | 164 |
| Tensile yield strength, psi. | 3800 |
| Tensile ultimate strength, psi. | 4100 |
| Elongation, % | 36.5 |

For comparison purposes, an acrylonitrile-butadiene-sytrene resin — which is not acrylic resin modified — is substituted into a formulation corresponding to that of Example 4. Blending, molding and property test data are as follows:

| Ingredients | Parts by weight |
| --- | --- |
| poly(2,6-dimethyl-1,4-phenylene) ether | 50 |
| acrylonitrile-butadiene-styrene resin* | 50 |
| Extrusion Conditions | |
| Die, °F. | 540 |
| Front, °F. | 650 |
| Rear, °F. | 540 |
| Screw speed, rpm | 60 |
| Molding conditions | |
| Barrel, °F. | 500 |
| Mold, °F. | 170 |
| Pressure, psi | 1000 |
| Properties | |
| Izod impact (ft.lbs./in. notch) | 0.60 |
| Heat distortion temperature, °F. | 335 |
| Tensile yield strength, psi. | 7100 |
| Tensile ultimate strength, psi. | 6700 |
| Elongation, % | 19 |

*Acrylonitrile-butadiene-styrene resin composition, Blendex 401, Marbon Chemical Division of Borg-Warner Corp., containing about 25% acrylonitrile units, 45% butadiene units and 30% styrene units, by weight.

It can be seen in comparison with Example 4, that the diene rubber-containing resin without acrylic modification provided a composition which lost all impact strength improvement and the excellent tensile elongation seen with acrylic modification.

EXAMPLE 6

The following formulation is blended, molded and tested by the procedure of Example 1:

| Ingredients | Parts by weight |
| --- | --- |
| poly(2,6-dimethyl-1,4-phenylene) ether (as in Example 1) | 50 |
| acrylic resin modified, acrylonitrile-butadiene-styrene resin (as in Example 1) | 40 |
| rubber modified high impact polystyrene resin* | 10 |
| Properties | |
| Izod impact (ft.lbs./in. notch) | 9.2 |

*Polybutadiene-modified polystyrene, Lustrex HT-91, Monsanto Chemical Company, containing about 8% by weight of polybutadiene rubber.

Thus the use of polyphenylene resin in combination with a polystyrene resin and an acrylic resin-modified diene rubber-containing resin provides very high impact strengths.

EXAMPLE 7

The following formulation is blended, molded and tested by the procedure of Example 1:

| Ingredients | Parts by weight |
| --- | --- |
| poly(2,6-dimethyl-1,4-phenylene) ether (as in Example 1) | 40 |
| acrylic resin-modified, acrylonitrile-butadiene-styrene resin (as in Example 1) | 40 |
| fibrous glass reinforcement (Q027-A, Owens Corning Fiberglas Corp.) | 20 |

A reinforced composition according to this invention is obtained.

To determine the environmental craze resistance of the present compositions, test pieces are placed under a 1% strain and immersed in gasoline at about 70°F. With the compositions of Example 3 (60:40 PPO/acrylic modified ABS) and Example 6 (50:40:10 PPO/acrylic modified ABS/rubber modified styrene resin) no crazing or cracking occurs even after several hours, indicating excellent resistance to this aggressive solvent. The glass reinforced composition of Example 7 also exhibits the same excellent resistance to attack by gasoline.

In contrast, the material prepared as above for comparison purposes — without acrylic ester modification of the diene rubber-containing resin — in addition to having poor notched Izod impact strength and poor tensile elongation, has very much less resistance to attack by gasoline.

EXAMPLE 8

The procedure of Example 6 is repeated, substituting, respectively for the acrylic resin-modified, acrylonitrile-butadiene-styrene resin, one having a rubbery butadiene-styrene copolymer backbone (78% BD - 22% Styrene), and for the polybutadiene rubber modified high impact polystyrene resin, a rubbery butadiene-styrene copolymer (78% BD - 22% Styrene) modified polystyrene. A composition according to this invention is obtained.

EXAMPLE 9

The following polyphenylene ethers are substituted for poly-(2,6-dimethyl-1,4-phenylene)ether in the formulation of Example 1:
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

Compositions according to this invention are obtained.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A normally rigid thermoplastic composition comprising
    a. a composition comprising a polyphenylene ether resin and a styrene resin and
    b. a resinous composition comprising a polymerized acrylic monomer and a polymerized diene rubber.

2. A composition as defined in claim 1 wherein component (b) is a resinous composition comprising a polymerized acrylic monomer and the polymerization product of a polymerized diene rubber, an alkenyl cyanide and a vinyl aromatic compound.

3. A reinforced composition as defined in claim 1 including a reinforcing amount of fibrous glass.

4. A composition as defined in claim 1 wherein the polyphenylene either of component (a) is characterized by the formula:

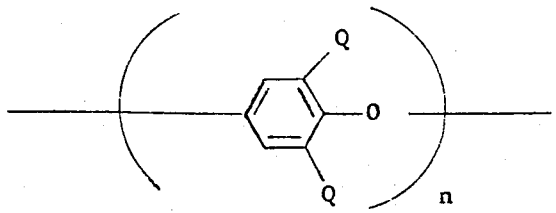

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus, and wherein component (b) is (i) an interpolymer of methyl methacrylate with a graft terpolymer of styrene, acrylonitrile and a diene rubber or (ii) a blend of poly(methyl methacrylate) and a graft terpolymer of styrene, acrylonitrile and a diene rubber.

5. A composition as defined in claim 4 wherein component (b) contains from about 20 to about 50% by weight of poly (methyl methacrylate) and from about 80 to about 50% by weight of a graft copolymer of acrylonitrile, diene rubber and styrene.

6. A composition as defined in claim 5 wherein the graft copolymer includes from about 40 to 90% by weight of grafted acrylonitrile and styrene and from 60 to 10% by weight of a polybutadiene or rubbery butadiene styrene copolymer backbone.

7. A composition as defined in claim 5 wherein the component (b) contains about 20 to 25% methyl methacrylate units, 5 to 10% acrylonitrile units, 30 to 40% butadiene units and 30 to 40% styrene units.

8. A normally rigid thermoplastic composition comprising
    a. a composition comprising a polyphenylene ether resin and a styrene resin and
    b. a resinous composition comprising a poly(alkyl methacrylate) and the polymerization product of a mixture of a polymerized diene rubber, and alkenyl cyanide and a vinyl aromatic compound, component (b) being present in an amount of from about 10 to about 80% by weight of the total resinous components of the composition.

9. A composition as defined in claim 8 wherein the polyphenylene ether of component (a) is characterized by the formula

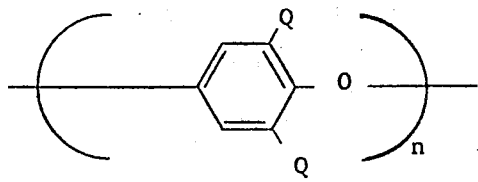

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

10. A composition as defined in claim 9 wherein each Q is alkyl having from 1 to 4 carbon atoms.

11. A composition as defined in claim 9 wherein each Q is methyl.

12. A composition as defined in claim 9 wherein said polyphenylene ether comprises at least 1% by weight of the total resinous components in said composition.

13. A composition as defined in claim 9 wherein component (b) is (i) an interpolymer of methyl methacrylate with a graft terpolymer of styrene, acrylonitrile and a diene rubber, or (ii) a blend of poly(methylmethacrylate) and a graft terpolymer of styrene, acrylonitrile and a diene rubber.

14. A composition as defined in claim 13 wherein component (b) contains from about 20 to about 50% by weight of poly(methyl methacrylate) and from about 80 to about 50% by weight of a graft copolymer of acrylonitrile, diene rubber and styrene.

15. A composition as defined in claim 14 wherein the graft copolymer includes from about 40 to 90% by weight of grafted acrylonitrile and styrene and from 60 to 10% by weight of a polybutadiene or rubbery butadiene styrene copolymer backbone.

16. A composition as defined in claim 14 wherein component (b) contains about 20 to 25% methyl methacrylate units, 5 to 10% acrylonitrile units, 30 to 40% butadiene units and 30 to 40% styrene units.

17. A composition as defined in claim 8 wherein component (a) comprises
   i. from 1 to 99% by weight of a polyphenylene ether of the formula

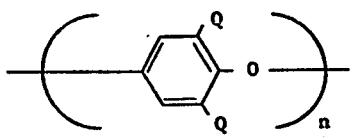

wherein Q is alkyl of from 1 to 4 carbon atoms and $n$ is an integer of at least 50 and
   ii. from 99 to 1% by weight of a styrene resin having at least 25% of the polymer units derived from a vinyl aromatic compound of the formula

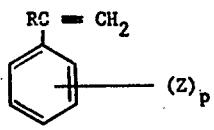

wherein R is hydrogen, alkyl of from 1 to 4 carbon atoms or halogen, Z is hydrogen, alkyl of from 1 to 4 carbon atoms or vinyl and $p$ is an integer of from 1 to 5.

18. A composition as defined in claim 17 wherein the styrene resin is a rubber modified styrene resin, said rubber comprising a diene rubber or a rubbery copolymer of butadiene and styrene in an amount of from about 4 to about 12% of said resin.

19. A composition as defined in claim 17 wherein the polyphenylene ether is poly(2,6-dimethyl-1,4-phenylene)ether.

20. A composition as defined in claim 8 wherein the polyphenylene ether comprises from about 1 to about 90% by weight of the total weight of the resinous components in said composition.

21. A composition as defined in claim 20 wherein said polyphenylene ether is poly(2,6-dimethyl-1,4-phenylene)ether and comprises from about 20 to about 90% by weight, component (b) is a composition of poly(methyl methacrylate), polybutadiene and grafted styrene and acrylonitrile and comprises from about 10 to about 80% by weight and the styrene resin component is a rubber modified polystyrene and comprises up to about 60% by weight of the total weight of the resinous components in said composition.

22. A normally rigid thermoplastic composition comprising:

a. a composition comprising a polyphenylene ether resin and a styrene resin, wherein component (a) comprises:
   i. from 1 to 99% by weight of a polyphenylene ether and
   ii. from 99 to 1% by weight of a styrene resin having at least 25% of the polymer units derived from a vinyl aromatic compound of the formula:

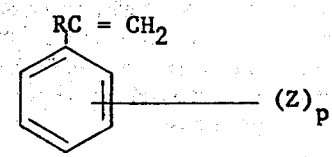

wherein R is hydrogen, alkyl of from 1 to 4 carbon atoms or halogen, Z is hydrogen, alkyl of from 1 to 4 carbon atoms or vinyl and $p$ is an integer of from 1 to 5; and b. a resinous composition comprising a component being (i) an interpolymer of methyl methacrylate with a graft terpolymer of styrene, acrylonitrile and butadiene rubber, or (ii) a blend of poly(methyl methacrylate) and a graft terpolymer of styrene, acrylonitrile and butadiene rubber, component (b) being in an amount of from 10 to about 80% by weight of the total resinous components of the composition.

23. A composition as defined in claim 22 wherein the polyphenylene ether of component (a) is characterized by the formula:

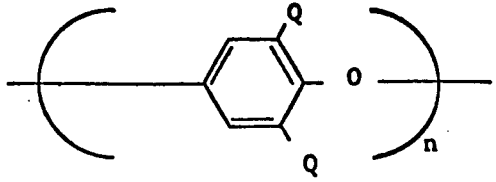

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

24. A composition as defined in claim 23 wherein each Q is an alkyl having from 1 to 4 carbon atoms.

25. A composition as defined in claim 24 wherein the polyphenylene ether is poly(2,6-dimethyl-1,4-phenylene ether.

26. A composition as defined in claim 22 wherein component (b) contains from about 20 to about 50% by weight of poly(methyl methacrylate) and from about 80 to about 50% by weight of a graft terpolymer of acrylonitrile, butadiene rubber and styrene.

27. A composition as defined in claim 26 wherein the graft terpolymer includes from about 40 to 90% by weight of grafted acrylonitrile and styrene and from 60 to 10% by weight of a polybutadiene or rubbery butadiene styrene copolymer backbone.

28. A composition as defined in claim 26 wherein component (b) contains about 20 to 25% methyl methacrylate units, 5 to 10% acrylonitrile units, 30 to 40% butadiene units and 30 to 40% styrene units.

29. A composition as defined in claim 22 wherein styrene resin (a)(ii) includes butadiene rubber or a rubbery copolymer of butadiene and styrene in an amount of from about 3 to 30% of said styrene resin.

30. A composition as defined in claim 22 wherein the polyphenylene ether of component (a) comprises from about 1 to about 90% by weight, resinous component (b) comprises from about 10 to about 80% by weight, and the styrene resin component comprises the remainder by weight of the total weight of the resinous components in said compositions.

31. A composition as defined in claim 30 wherein said polyphenylene ether is poly(2,6-dimethyl-1,4-phenylene) ether and comprises from about 20 to about 90% by weight, component (b) is a composition of poly(methyl methacrylate), polybutadiene and grafted styrene and acrylonitrile and comprises from about 10 to about 80% by weight and the styrene resin component (a)(ii) includes butadiene rubber or a rubbery copolymer of butadiene and styrene and comprises up to about 60% by weight of the total weight of the resinous components in said composition.

32. A reinforced composition as defined in claim 22 including a reinforcing amount of fibrous glass.

* * * * *

UNITED STATES PATENT AND TRADEMARK OFFICE
CERTIFICATE OF CORRECTION

PATENT NO. : 3,983,090
DATED : September 28, 1976
INVENTOR(S) : Visvaldis Abolins et al It is certified that error appears in the above-identified patent and that said Letters Patent are hereby corrected as shown below:

In Col. 1, line 29, correct "moled" to read -- molded --; on line 48, delete "assigned", second occurrence.
In Col. 3, line 21, delete "the".
In Col. 5, line 40, correct "butadient" to read -- butadiene --.
In Col. 7, line 43, "poly(methylacrylate)" should read -- poly(methyl methacrylate) --.

Signed and Sealed this

First Day of February 1977

[SEAL]

Attest:

RUTH C. MASON
*Attesting Officer*

C. MARSHALL DANN
*Commissioner of Patents and Trademarks*